United States Patent
Tsin et al.

(10) Patent No.: US 9,025,823 B2
(45) Date of Patent: May 5, 2015

(54) TRACKING TEXTURE RICH OBJECTS USING RANK ORDER FILTERING

(71) Applicant: QUALCOMM Incorporated, San Diego, CA (US)

(72) Inventors: Yanghai Tsin, San Diego, CA (US); Kiyoung Kim, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 13/797,742

(22) Filed: Mar. 12, 2013

(65) Prior Publication Data

US 2014/0270346 A1 Sep. 18, 2014

(51) Int. Cl.
*G06K 9/00* (2006.01)
*G06T 7/00* (2006.01)

(52) U.S. Cl.
CPC .................................... *G06T 7/0042* (2013.01)

(58) Field of Classification Search
None
See application file for complete search history.

(56) References Cited

U.S. PATENT DOCUMENTS

| | | | |
|---|---|---|---|
| 6,330,356 B1 | 12/2001 | Sundareswaran et al. | |
| 7,088,862 B1 * | 8/2006 | Silver et al. | 382/199 |
| 8,315,432 B2 | 11/2012 | Lefevre et al. | |
| 2002/0191862 A1 | 12/2002 | Neumann et al. | |
| 2008/0267454 A1 * | 10/2008 | Kobayashi et al. | 382/106 |
| 2009/0080738 A1 * | 3/2009 | Zur et al. | 382/131 |
| 2010/0142826 A1 * | 6/2010 | Kotake et al. | 382/203 |
| 2011/0206274 A1 * | 8/2011 | Tateno et al. | 382/154 |
| 2011/0286631 A1 | 11/2011 | Wagner et al. | |
| 2012/0105578 A1 * | 5/2012 | Ohmiya et al. | 348/36 |
| 2012/0188342 A1 | 7/2012 | Gervautz et al. | |
| 2012/0194644 A1 | 8/2012 | Newcombe et al. | |
| 2012/0262455 A1 | 10/2012 | Watanabe et al. | |
| 2012/0320053 A1 * | 12/2012 | Miyatani | 345/420 |

OTHER PUBLICATIONS

H.Wuest, F.Vial, and D.Stricker, "Adaptive line tracking with multiple hypotheses for augmented reality," Proc.The Fourth Int'l Symp. on Mixed and Augmented Reality(ISMAR05), pp. 62-69, 2005, hereinafter Wuest.*

Clarke, et al., "Detecting and Tracking Linear Features Efficiently," British Machine Vision Conference, 1996, 10 pages.

Distinctive Image Features from Scale-Invariant Keypoints, David G. Lowe, Computer Science Department University of British Columbia, Vancouver, B.C., Canada, Jan. 5. 2004, http://www.cs.ubc.ca/~lowe/papers/ijcv04.pdf.

(Continued)

*Primary Examiner* — Aaron W Carter
*Assistant Examiner* — Ian Lemieux
(74) *Attorney, Agent, or Firm* — Kilpatrick Townsend & Stockton LLP

(57) ABSTRACT

A method of real-time tracking of an object includes capturing a first and a second image of the object. The object is detected in the first image and movement of the object is tracked between the images. Tracking of the object includes obtaining an initial pose of the camera; projecting an image of a model object onto the second image; determining a gradient profile of the second image from an edge point of the model object along a first direction that is normal to the edge of the model object; computing a radius on the gradient profile; determining a rank order of the peaks of the gradient profile along the radius; comparing the rank order with a predetermined rank order to generate a feature candidate point; and reducing a distance along the first direction between the feature candidate point and the edge point on the edge of the model object.

40 Claims, 10 Drawing Sheets

(56) References Cited

OTHER PUBLICATIONS

Hebert, M., et al., "Detecting & Using Object Boundaries", Website: http://www.cs.cmu.edu/-stein/nsf_webpage/, Date Accessed: Oct. 4, 2010, 10 pages.

Liu, et al., "A Computational Model for Repeated Pattern Perception using Frieze and Wallpaper Groups," Computer Vi and Pattern Recognition (CVPR) 2000, vol. 1, pp. 537-544.

Singh, et al., "Order Consistent Change Detection via Fast Statistical Significance Testing," IEEE Computer Vision and Pattern Recognition Conference, Anchorage, Alaska, Jun. 2008, p. 8.

Wagner D., et al., "Pose tracking from natural features on mobile phones", 7th IEEE/ACM International Symposium on Mixed and Augmented Reality (ISMAR), Sep. 15, 2008, pp. 125-134, IEEE, XP031343987, ISBN: 978-1-4244-2840-3.

* cited by examiner

TRACKING TEXTURE RICH OBJECTS USING RANK ORDER FILTERING

BACKGROUND

This disclosure relates generally to augmented reality applications, and in particular but not exclusively, relates to the tracking of an object in augmented reality applications.

A significant challenge to enabling Augmented Reality (AR) on mobile phones or other mobile platforms is the problem of tracking objects robustly and in real-time. Object tracking for AR applications has very demanding requirements: it must deliver full six degrees of freedom, give absolute measurements with respect to a given coordinate system, be very robust and run in real-time. Of interest are methods to compute camera pose using computer vision (CV) based approaches, which rely on first detecting and, subsequently, tracking objects within the camera view. In one aspect, the tracking operations include detecting and tracking the edges of the object in order for the augmentations rendered by the graphics engine to be tightly aligned with the real (world) object.

The main difficulty in an edge-based tracker is the correspondence problem, i.e., to reliably and correctly match a model edge segment (can be 2D or 3D) to one of the detected edge pixels in an image. Establishing correspondences is typically straightforward for objects that have high contrast, sparse and well defined edges, for example, by associating the model edge to the eligible edge pixel nearest to its projection in the image (nearest neighbor association). This simple approach usually results in a large number of correctly matched model-image edge pairs, assuming that interframe motion of the model projection is small. However, when there are rich textures on the target object, edge pixels are more difficult to match. For example, nearest neighbor association is likely to contain a large number of erroneous correspondences, due to the number of edge pixels detected next to the model projection and their appearance ambiguity. A large number of erroneous feature correspondences eventually leads to tracking failure. Furthermore, in an AR application, faster tracker is preferred, since faster trackers leave more time for complex virtual object rendering. As a result, there is the need for efficient feature correspondence methods.

SUMMARY

These problems and others may be solved according to various embodiments, described herein.

According to one aspect of the present disclosure, a method of real-time tracking of an object includes capturing, with a camera, a first and a second image of the object. The object is detected in the first image and movement of the object between the first and second images is tracked. Tracking of the object includes obtaining an initial pose of the camera; projecting an image of a model object onto the second image; determining a gradient profile of the second image from an edge point on an edge of the model object along a first direction that is normal to the edge of the model object; computing a radius on the gradient profile; determining a rank order of the peaks of the gradient profile along the radius; comparing the rank order with a predetermined rank order to generate a feature candidate point; and reducing a distance along the first direction between the feature candidate point and the edge point on the edge of the model object.

According to another aspect of the present disclosure, a computer-readable medium includes program code stored thereon for real-time tracking of an object. The program code includes instructions to capture, with a camera, a first and a second image of the object, where the object has a plurality of edges. The program code also includes instructions to detect the object in the first image and to track the object between the first image and the second image. The instructions to track the object further includes instructions to: obtain an initial pose of the camera in response to the detecting of the object in the first image; project an image of a model object onto the second image based on the initial pose of the camera; determine a gradient profile of the second image from a edge point on an edge of the model object along a first direction that is normal to the edge of the model object, where the gradient profile includes a plurality of peaks; compute a radius for determining feature correspondence on the gradient profile; determine a rank order of the peaks of the gradient profile along the radius; compare the rank order with a predetermined rank order to generate a feature candidate point; and reduce a distance along the first direction between the feature candidate point and the edge point on the edge of the model object.

In a further aspect of the present disclosure, an apparatus includes a camera, a memory, and a processing unit. The memory is adapted to store program code for real-time tracking of an object. The processing unit is adapted to access and execute instructions included in the program code. When the instructions are executed by the processing unit, the processing unit directs the apparatus to capture, with the camera, a first and a second image of the object, where the object has a plurality of edges. The processing unit also directs the apparatus to detect the object in the first image and to track the object between the first image and the second image. The processing unit further directs the apparatus to: obtain an initial pose of the camera in response to the detection of the object in the first image; project an image of a model object onto the second image based on the initial pose of the camera; determine a gradient profile of the second image from an edge point on an edge of the model object along a first direction that is normal to the edge of the model object, where the gradient profile includes a plurality of peaks; compute a radius for determining feature correspondence on the gradient profile; determine a rank order of the peaks of the gradient profile along the radius; compare the rank order with a predetermined rank order to generate a feature candidate point of the second image; and reduce a distance along the first direction between the feature candidate point and the edge point on the edge of the model object.

In yet another aspect of the present disclosure, a system for real-time tracking of an object includes means for capturing, with a camera, a first and a second image of the object, wherein the object has a plurality of edges. The system also includes means for detecting the object in the first image and means for tracking the object between the first image and the second image. The means for tracking the object includes: means for obtaining an initial pose of the camera in response to the detecting of the object in the first image; means for projecting an image of a model object onto the second image based on the initial pose of the camera; means for determining a gradient profile of the second image from an edge point on an edge of the model object along a first direction that is normal to the edge of the model object, where the gradient profile includes a plurality of peaks; means for computing a radius for determining feature correspondence on the gradient profile; means for determining a rank order of the peaks of the gradient profile along the radius; means for comparing the rank order with a predetermined rank order to generate a feature candidate point of the second image; and means for reducing a distance along the first direction between the feature candidate point and the edge point on the edge of the model object.

The above and other aspects, objects, and features of the present disclosure will become apparent from the following description of various embodiments, given in conjunction with the accompanying drawings.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Reference throughout this specification to "one embodiment", "an embodiment", "one example", or "an example" means that a particular feature, structure, or characteristic described in connection with the embodiment or example is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Any example or embodiment described herein is not to be construed as preferred or advantageous over other examples or embodiments.

Figure 1A:
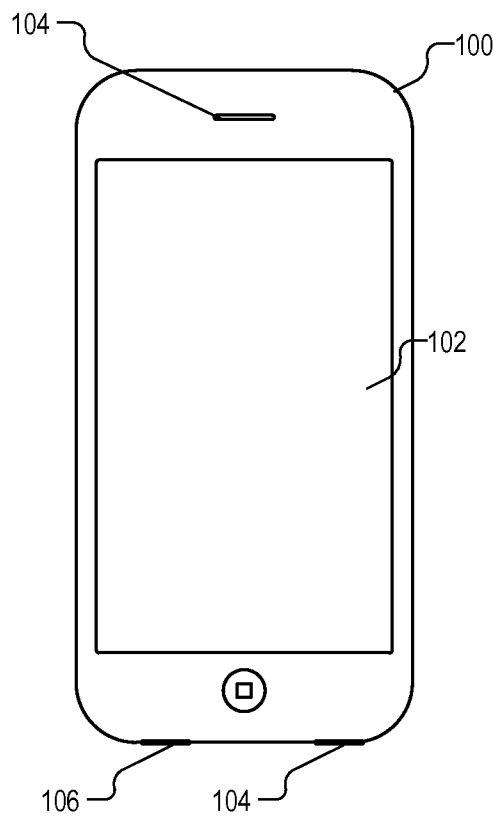
FIGS. 1A and 1B illustrate a front side and a backside, respectively, of a mobile platform capable of detecting and tracking an object using rank order filtering.
Figure 1B:
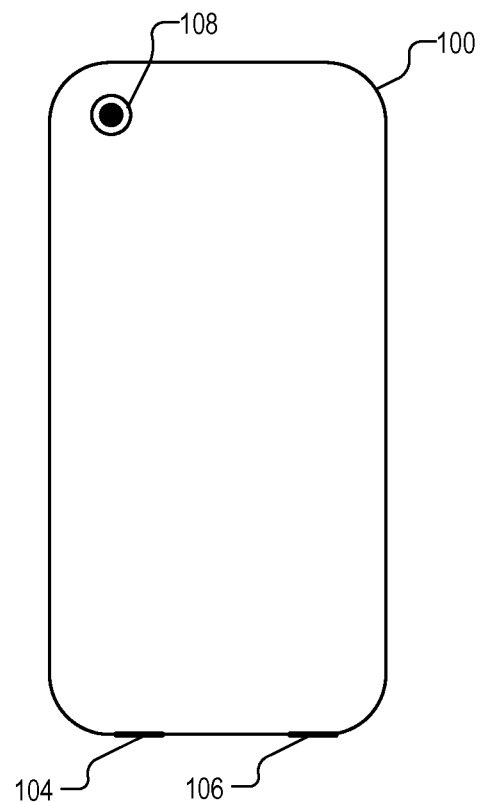

FIGS. 1A and 1B illustrate a front side and a backside, respectively, of a mobile platform 100 capable of detecting and tracking an object using rank order filtering, as described herein. Mobile platform 100 is illustrated as including a display 102, speakers 104, and microphone 106. Mobile platform 100 further includes a camera 108 for capturing images of an environment. Mobile platform 100 may further include motion sensors (not shown), such as accelerometers, gyroscopes or the like, which may be used to assist in determining the pose of mobile platform 100 or equivalently the camera 108, which may have a known/calibrated position relationship to the motion sensors. The pose of mobile platform 100 may also or alternatively be determined using vision based tracking techniques.

As used herein, a mobile platform refers to any portable electronic device such as a cellular or other wireless communication device, personal communication system (PCS) device, personal navigation device (PND), Personal Information Manager (PIM), Personal Digital Assistant (PDA), or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all electronic devices, including wireless communication devices, computers, laptops, tablet computers, etc. which are capable of augmented reality (AR).

In AR applications, a real world object is imaged and displayed on a screen along with computer generated information, such as an image, a 3D virtual actor or textual information. In AR, the imaged real world objects are detected and tracked in order to determine the camera's position and orientation (pose) information relative to the object. This information is used to correctly render the graphical object to be displayed along with the real-world object. The real world objects that are detected and tracked may be either two-dimensional (2D) or three-dimensional (3D) objects.

A significant challenge to enabling AR on mobile phones or other mobile platforms is the problem of estimating and tracking the camera pose accurately and in real-time. Pose tracking for AR applications has very demanding requirements: it must deliver full six degrees of freedom, give absolute measurements with respect to a given coordinate system, be very robust and run in real-time. Of interest are methods to compute pose using computer vision (CV) based approaches, which rely on first detecting and, subsequently, tracking objects within the camera view.

Figure 2A:
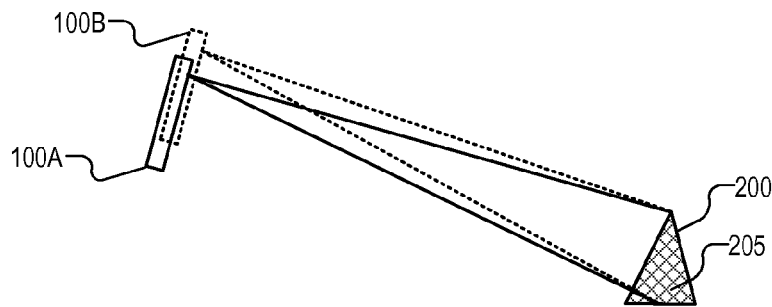
FIG. 2A illustrates the movement of a mobile platform with respect to an object and a change in camera pose.
Figure 2B:
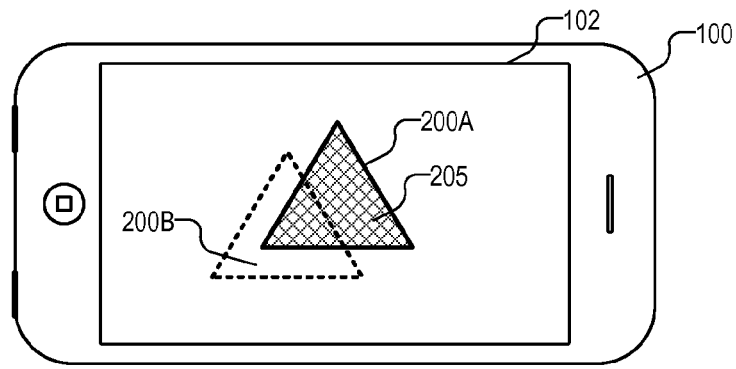
FIG. 2B illustrates the movement of an object on the display of a mobile platform.

FIG. 2A illustrates a side view of mobile platform 100 capturing first and second images of real-world object 200. That is, numeral 100A illustrates the capturing of a first image of object 200 while the mobile platform is in a first position relative to object 200 and numeral 100B illustrates the capturing of a second image of object 200 while the mobile platform is in a second position. Due to the movement of the mobile platform, the pose of the camera has changed and thus any computer-generated AR graphics may need to be adjusted either by updating the angle of view or the size of the graphics. Furthermore, movement of the mobile platform will translate to movement of the captured object between the first and second images. For example, FIG. 2B illustrates the movement of object 200 on display 102 of a mobile platform. The movement of the mobile platform results in a shifting of object 200 on display 102. That is, numeral 200A illustrates the position of object 200 in the first captured image when the mobile platform is in a first position (e.g., position 100A of FIG. 2A), and numeral 200B illustrates the position of object 200 in the second captured image when the mobile platform is in a second position (e.g., position 100B of FIG. 2A). In the illustrated example, object 200 has moved to the left and down with respect to the object placement within the captured image on display 102. In various examples, the object movement may be caused by the actual object moving, the mobile platform moving, or a combination of both. The mobile platform needs to track this movement so that augmentations that are rendered remain in proper size and perspective.

Edge detection and correspondence finding are commonly implemented for tracking movement of objects in AR applications. However, object 200 may be a texture rich object. That is, object 200 may be a 2D or 3D object that has a surface 205 that includes several lines, contrast changes, various colors, gradient shadings, or other aspects that may make traditional methods of edge detection and matching difficult. The texture rich aspect of surface 205 is shown as cross-hatching in FIGS. 2A and 2B, but which has been removed in some figures so as not to obscure details of the present disclosure.

In order to track this movement of a texture rich object, as well as of non-texture rich objects, embodiments of the present disclosure provide for the rank order filtering of feature candidate points and comparing them with model edge points of a model object, so as to increase robustness of the tracking and to reduce the number of falsely matched edge points for matching with a projected model. Thus, the embodiments of the present disclosure may include two distinct operations: (1) the pre-deployment building of the model object for use in subsequent tracking operations; and (2) the detection and tracking of a real world object using the previously built model object as a reference. These and other features of the present disclosure are described in more detail below.

Figure 3A:
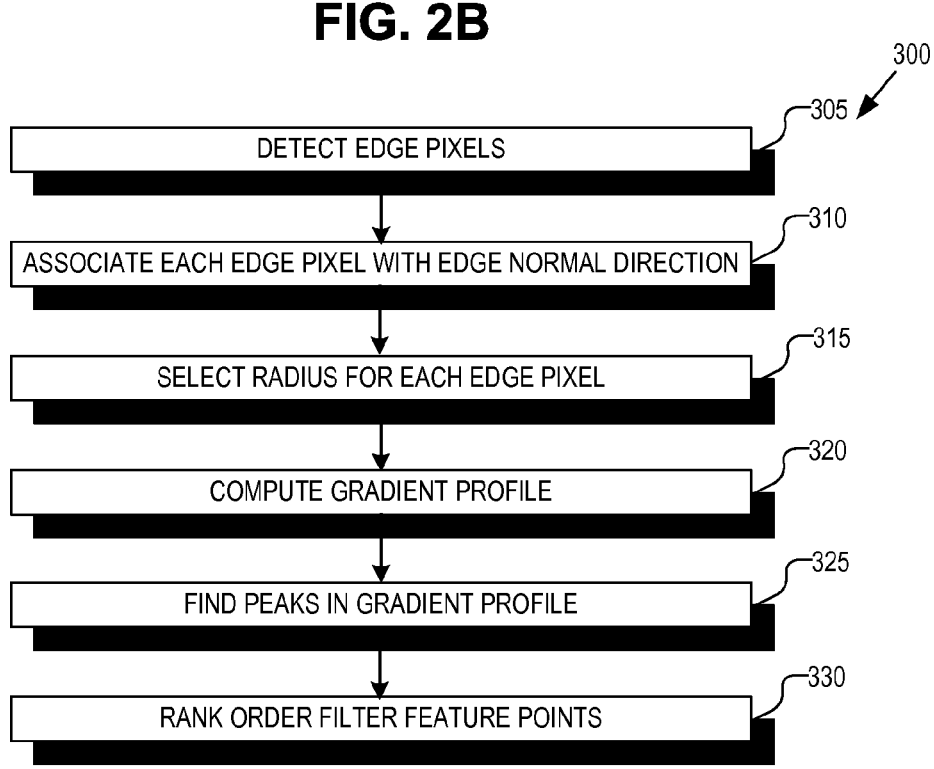
FIG. 3A is a flowchart illustrating a process of building a model object.
Figure 3B:
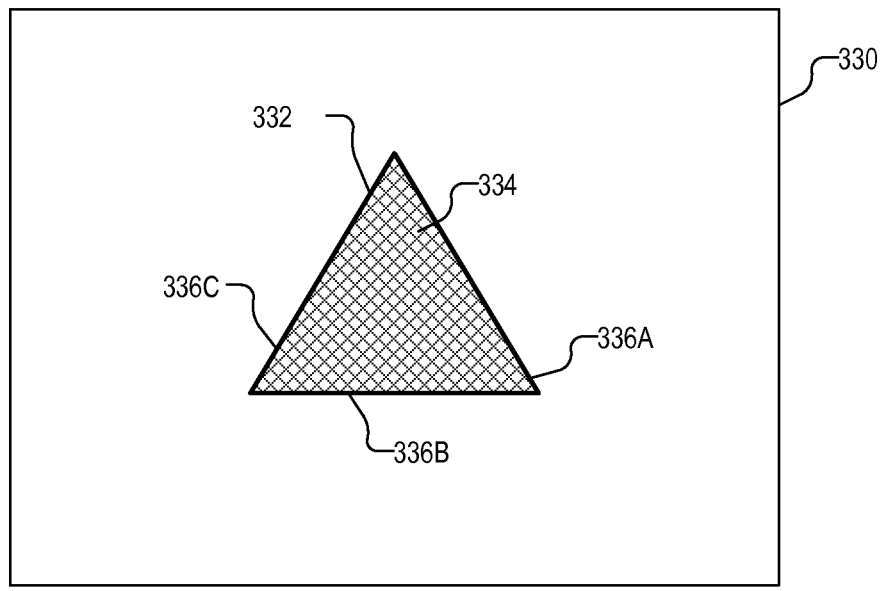
FIG. 3B illustrates an image of an object having a rich texture.

FIG. 3A is a flowchart illustrating a process 300 of building a model object. In process block 305 edge pixels of a model object are detected using an edge detection algorithm. In one embodiment, the edge detection algorithm is a known algorithm, such as the Canny Edge Detector algorithm. FIG. 3B illustrates a model image 330 including the model object 332 having a texture rich surface 334 and detected edge segments 336A-C. Model image 330 may be a digital image that is used to print an AR object; a photograph of an object with known camera pose; or a texture image used to render a computer-aided-design (CAD) model of a 3D object. In all cases the transformation between a point in the model image 330 and object 332 is known.

Figure 3C:
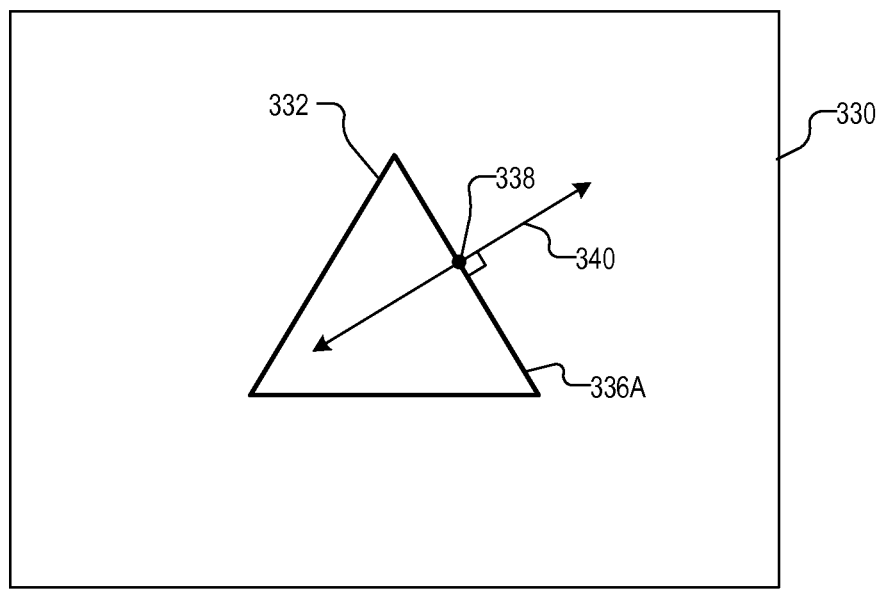
FIG. 3C illustrates an edge point on an edge of the model object and a direction that is normal to the edge of the model object.

Next, in process block 310 each edge pixel of model object 332 is associated with an edge-normal direction, i.e., the direction that is perpendicular to the direction of the edge segment. FIG. 3C illustrates a single edge point 338 on edge segment 336A of the model object and a direction 340 that is normal to the edge of the model object. In one embodiment, normal direction 340 is selected such that along the normal direction, a subsequently computed image gradient is positive at edge pixel 338. That is, this is to say that along the normal direction, we will observe dark to bright image intensity transition. This convention of edge normal direction provides an additional eligibility constraint for finding edge correspondences as will become clear in the feature matching process to be discussed below.

Proceeding now to process block 315, a radius is selected for each edge pixel of model object 332. The selected radius provides the interaction range of each edge pixel with its neighboring edge pixels. In one embodiment, the selected range for each edge pixel is determined empirically, where edge pixels for objects of a different shape and/or texture may be optimized with differing radii. For example, with a larger radius, more distinctive (i.e., higher contrast) features may be preserved which may make the matching process less ambiguous and thus, more successful. However, if the radius is too large, the number of survived features will be small and the tracking quality can be compromised. Thus, a tradeoff exists when selecting a radius between matching success rate and the ability to track in a highly zoomed in view of a small part of the target object.

Radius selection may be based on one or more of the following criteria. First, the radius may be selected so that it can minimize ambiguous correspondences along the normal direction within the search range. Second, radius selection should be based on the desired tracking scale. That is, in the highly zoomed in case, it may be based on the largest target size that needs to be tracked—the radius should be small enough such that there are still enough features for tracking within any sub-region of the target. In the case where you are highly zoomed out, radius selection should be based on the smallest target size that needs to be tracked—the radius should be large enough so the scaled radius is still functional. Third, the radius can be chosen adaptively based on local texture density and targeted database size. By way of example, the larger the radius selected, the smaller the database used. Fourth, the radius can be chosen experimentally based on a test video database that contains sufficiently representative camera motions and target size, target viewing angles and lighting conditions, where the radius that gives the best tracking results can be selected.

Figure 3D:
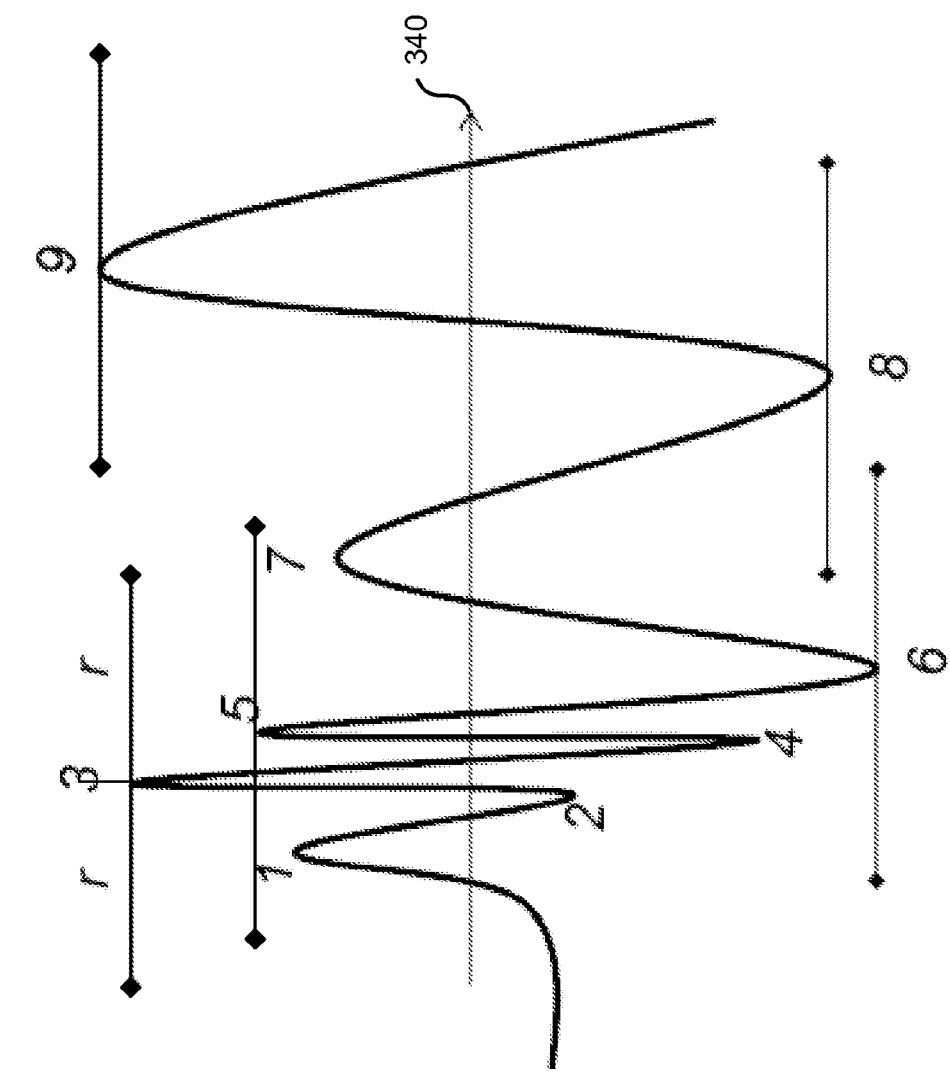
FIG. 3D illustrates a gradient profile of the model object along the direction of FIG. 3C.

In process block 320, a gradient profile is computed along direction 340. FIG. 3D illustrates a gradient profile 342 of the model object along the direction 340 of FIG. 3C. Any known gradient extraction algorithm may be utilized to generate gradient profile 342. For example, determining the gradient profile may first include taking an intensity profile along direction 340 and then calculating a first order derivative of the intensity profile to arrive at the gradient profile 342. In one embodiment, taking the intensity profile along direction 340 includes interpolating neighboring pixels so that the intensity values are robust against image noise. For example, intensity values may be interpolated from neighboring pixels within a three pixel by three pixel window.

As shown in FIG. 3D, gradient profile 342 includes a plurality of peaks (both positive and negative). This is due to the texture rich properties of object 332. Process block 325 includes finding these peaks in the gradient profile 342. Incorrectly established correspondences between the model edges and the image edges may lead tracking failure. Thus, various embodiments provide for reducing the probability of incorrectly matched candidate points by filtering peaks included in the gradient profile 342 using mechanisms of rank order filtering, including extended non-maximum suppression.

For example, process block 330 includes the rank order filtering of feature points in gradient profile 342. In one embodiment, each peak is ranked based on its magnitude within the previously determined radius r from each respective peak. By way of example, peak 3 may be ranked a number one peak since its magnitude is the largest within radius r from peak 3. Similarly, peak 5 may be ranked a number two peak since its magnitude is the second largest within radius r of peak 5. Although peaks 2, 4, and 6 are within the radius r of peaks 3 and 5, they are of a different sign (i.e., negative) and thus, have no interaction with peaks 3 and 5. Peak 9 may also be designated a number one peak since its magnitude is the largest within radius r of peak 9.

In one embodiment, the magnitudes of all the peaks in the model image are kept. As will be described in more detail below, the subsequent matching, process takes into consideration the relative magnitude of the peaks and the image noise using rank order statistics.

In yet another embodiment, non-maximum peaks are suppressed and not used for establishing a rank order of the model object. For example, only peaks that are designated as a number one peak may be included in the model for feature correspondence. In the example of FIG. 3D, peaks 3 and 9 are maximum (i.e., the largest magnitudes) within their respective radius r, while peaks 1, 5, and 7 are non-maximum peaks and are thus suppressed (i.e., not used further). As above, peaks 2, 4, 6, and 8 are not used because they are of a different sign (i.e., negative).

Therefore, the survived model object contains a set of survived model edge points with their correspondence attributes (e.g., 2D or 3D geometric properties and/or relative gradient magnitudes). Now that the model object has been built, including determining the rank order characteristics of the model object, embodiments of the present disclosure may now focus on the detection and tracking of a real-world object using the model object as a reference.

Figure 4:
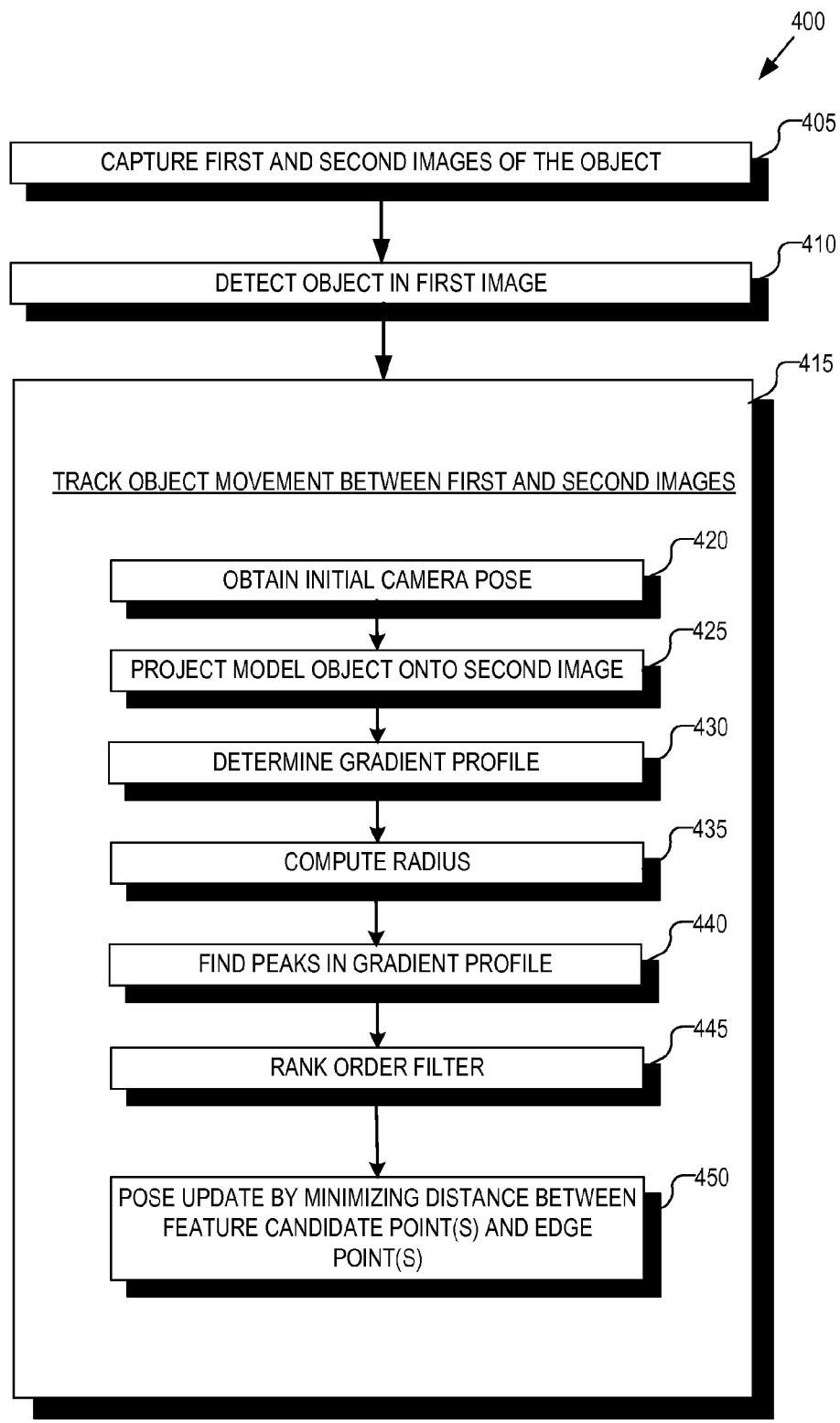
FIG. 4 is a flowchart illustrating a process of detecting and tracking an object.
Figure 5:
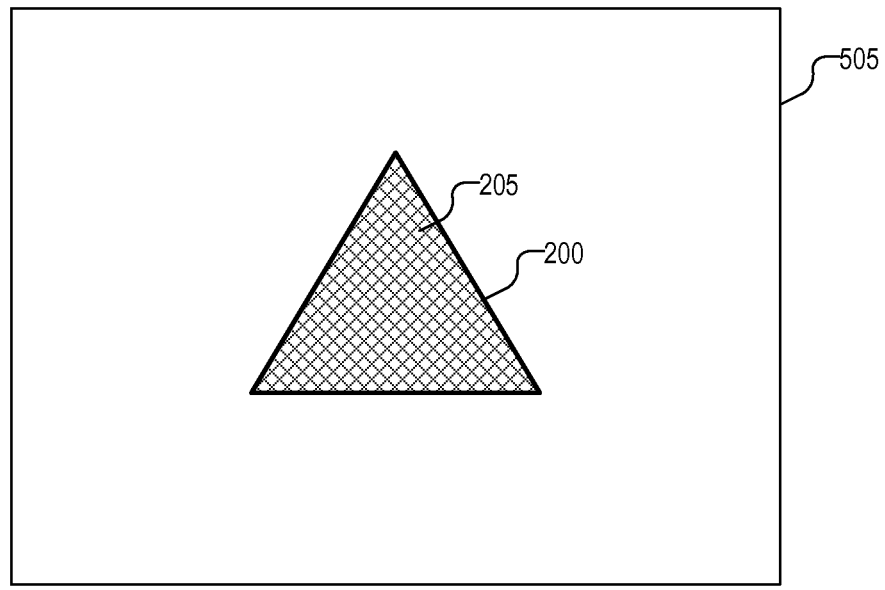
FIG. 5 illustrates a first image of an object having a rich texture.
Figure 6:
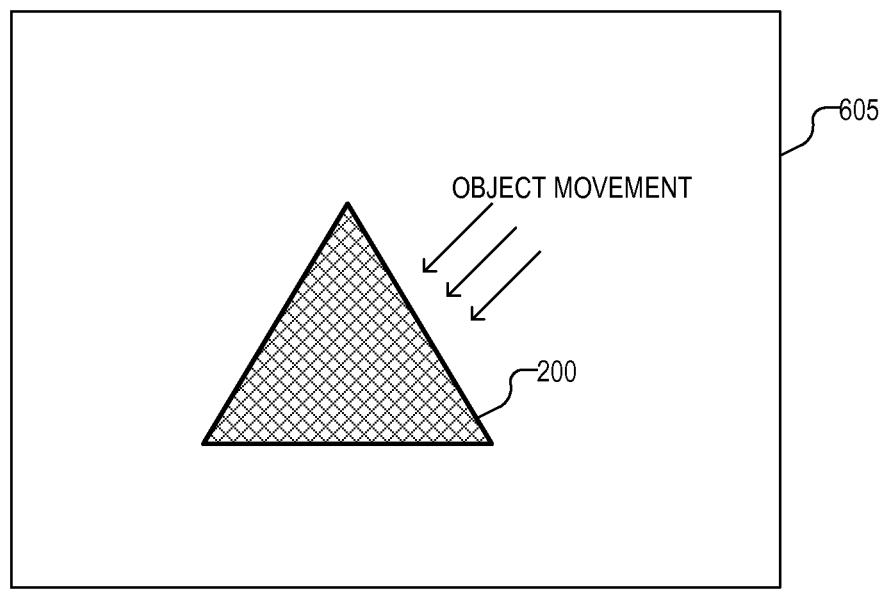
FIG. 6 illustrates a second image of the object moved with respect to the first image of FIG. 5.

FIG. 4 is a flowchart illustrating a process 400 of detecting and tracking an object (e.g., object 200 of FIG. 2A). Process 400 will be described with reference to FIGS. 4-11. In process block 405, a mobile platform captures a first and a subsequent second image of an environment containing a real-world object. For example, FIG. 5 illustrates the first captured image 505 that includes object 200 having a texture rich surface 205. FIG. 6 illustrates the second captured image 605 captured by the mobile platform, where object 200 has moved with respect to the object placement within the captured image. As mentioned above, the object movement may be caused by the actual object moving, the camera moving, or a combination of both. In the illustrated example of FIG. 6, object 200 of second image 605, has moved down and to the left.

Referring back to FIG. 3, process block 410 includes the mobile platform detecting the object in first image 505. The detection process may be implemented using any known technique. For example, the detection process may include searching the first image 505 to match keypoints against a feature database. The detection process may then check the matches using geometrical constraints against outliers.

Next, in process block 415, the movement of the object between the first and second images is tracked. The tracking of movement of the object between the first image 105 and the second image 205 first includes process block 420 which obtains an initial pose of the camera based on the detection of object 200 in the first image 505. The initial pose of the camera is calculated using known techniques to determine the position of the camera with respect to object 200 detected in the first image 505. The pose may be determined in, for example, six-degrees of freedom.

Figure 7:
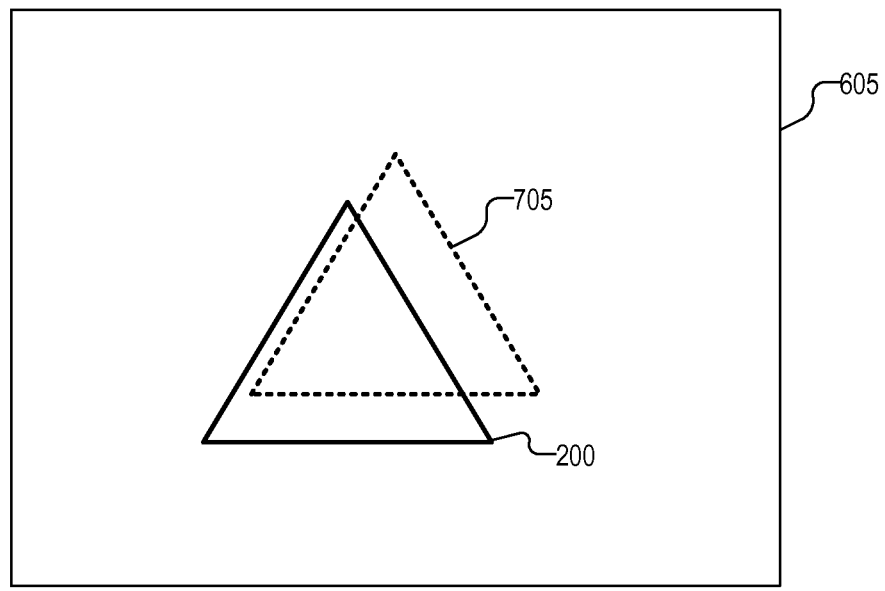
FIG. 7 illustrate the projection of a model object onto the second image.

The process then proceeds to process block 425 where the mobile platform projects an edge feature of the previously built model object onto the second image 605. In one embodiment, the model object is locally stored on the mobile platform. In another embodiment, the model object is dynamically retrieved from a remote server (e.g., the cloud). As described above, the model object is a previously learned object from, e.g., a reference image, from which a feature dataset is created. FIG. 7 illustrates model object 705 projected onto image 605. As can be seen, the position of the model object 705 roughly corresponds with the position of object 200 in image 505 prior to its movement. The projection of model object 705 may include changing the size of the model object based on how close the mobile platform is to the actual object and/or may include skewing the model object based on the angle at which the mobile platform is with respect to the actual object 200.

Figure 8:
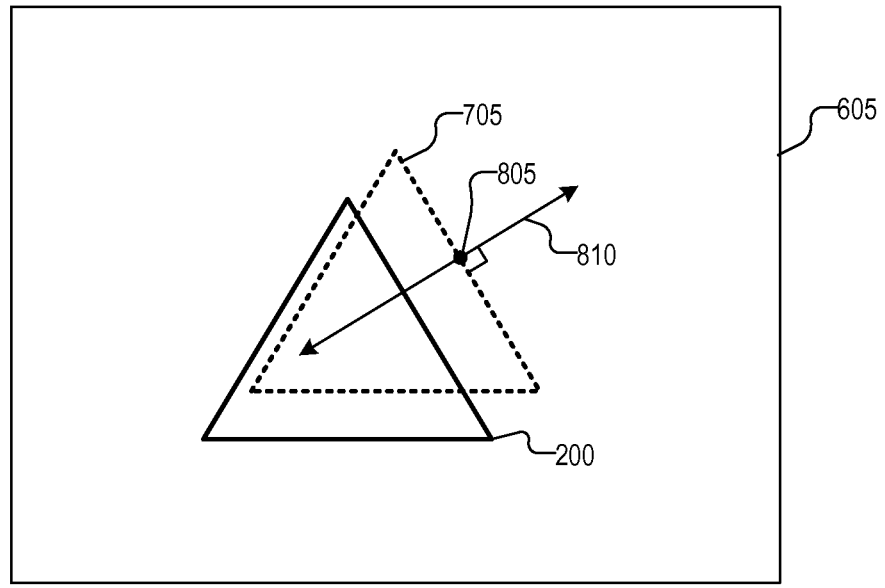
FIG. 8 illustrates an edge point on an edge of the model object and a direction that is normal to the edge of the model object.

Next, in process block 430 a gradient profile is determined. Determining the gradient profile may first include projecting a line from an edge of the model object and determining the gradient profile along that line. For example, FIG. 8 illustrates an edge point 805 on an edge of the model object 705. A direction 810 that is normal (i.e., perpendicular) to the edge at point 805 of the model object 705 is then computed. A gradient profile of the second image 605 is then determined along direction 810.

Figure 9:
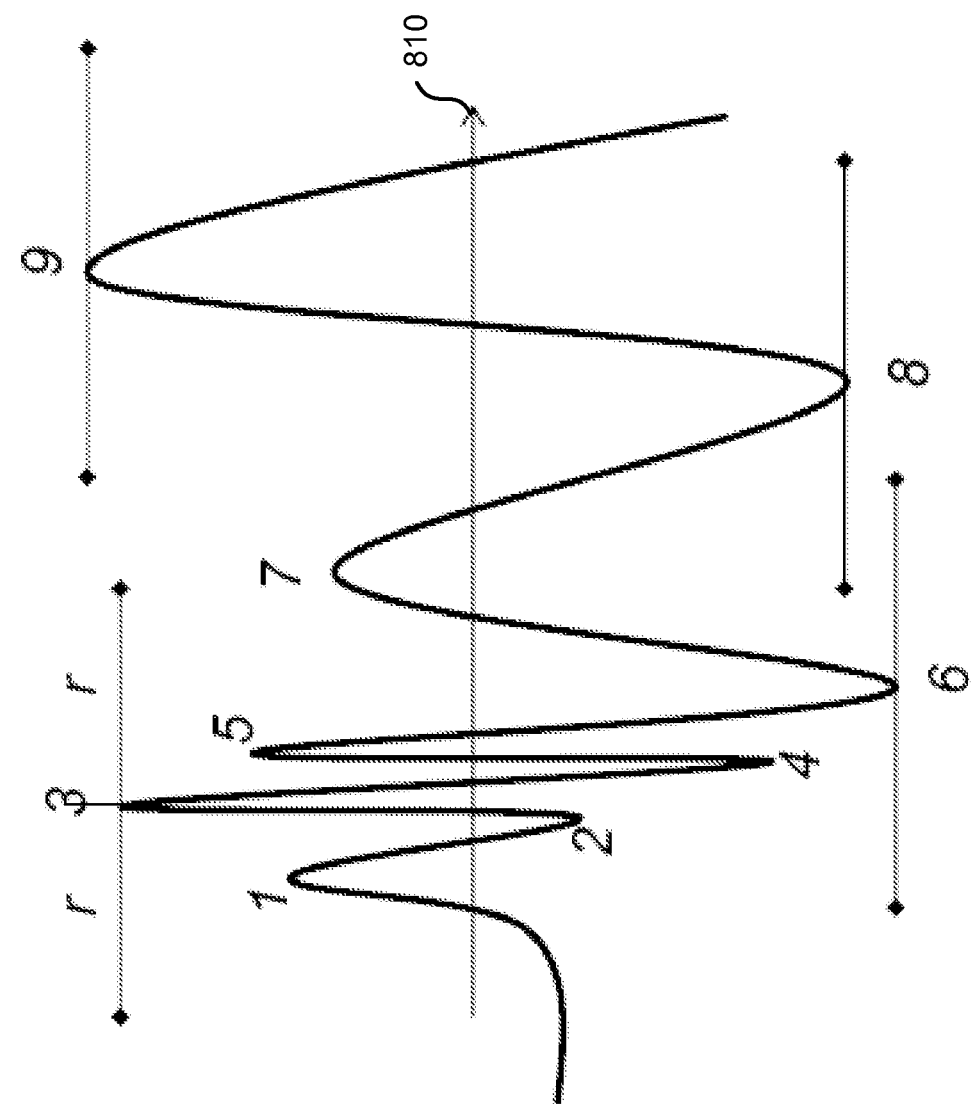
FIG. 9 illustrates is a gradient profile of the second image along the direction of FIG. 8.

FIG. 9 illustrates an example gradient profile 900 taken along direction 810 through edge point 805. Any known gradient extraction algorithm may be utilized to generate gradient profile 900. For example, determining the gradient profile may first include taking an intensity profile along direction 810 and then calculating a first order derivative of the intensity profile to arrive at the gradient profile 900. In one embodiment, taking the intensity profile along direction 810 includes interpolating neighboring pixels so that the intensity values are robust against image noise. For example, intensity values may be interpolated from neighboring pixels within a three pixel by three pixel window.

As shown in FIG. 9, gradient profile 900 includes a plurality of peaks (both positive and negative). This is due to the texture rich properties of object 200. Only one of the peaks included in gradient profile 900 may correspond to the edge point of object 200 being tracked. Incorrectly established correspondences between the model edges and the image edges may lead to tracking failure. Thus, various embodiments provide for reducing the probability of incorrectly matched candidate points by filtering peaks included in the gradient profile 900 using mechanisms of rank order filtering. To do this, first the pre-defined radius r in the model is appropriately scaled for edge point 805 (i.e., process block 435). As mentioned above, the radius r in the model for each edge point may be pre-determined based on experimental results with the model object. Thus, each edge point of the model object may have an associated radius r. That is, some edge points of the model object may track better with a smaller radius, while other edge points may track better with a larger radius.

Furthermore, the radius r may need to be scaled based on the initial camera pose determined in process block 420. By way of example, the radius r would be smaller for objects that are farther away from the camera due to the fact that object 200 may appear smaller the farther away the mobile platform is from object 200.

As mentioned above a convention for edge normal direction was defined in the model building stage: along the normal direction gradient at the model edge is positive (dark to bright). As a result, to find a corresponding image edge, we only need to investigate peaks with positive signs. This filtering strategy reduces erroneous feature correspondences.

After the radius r is computed, process 400 proceeds to process block 440, where the peaks in the gradient profile are found and to process block 445 where the rank order for the peaks within radius r of the gradient profile are determined. In one embodiment, all peaks are kept, but are ranked according to their magnitude for comparison with other peaks in the gradient profile within the scaled radius. For example, peak 3 may be the number one feature candidate point, while peak 5 is the number two feature candidate point (i.e., 3 is higher than 5, while 5 is higher than any other peak of the same sign within radius r). For feature matching purposes, image edge corresponding to peak 3 is matched to a model edge that is the number one feature within the radius r, while peak 5 is only matched to a model edge that is a number two within radius r. That is, the model edge that peak 5 is matched to needs to have a single more dominant peak within radius r. This establishes a robust filtering strategy that rank order (number one or number two) is used to match a model edge to an image edge.

In another embodiment, the magnitudes of all the peaks in the model image are kept. The feature matching process then takes into consideration the relative magnitude of the peaks and the image noise using rank order statistics. For example, if the magnitude difference between the number one peak and number two peak is large compared to image noise magnitude, we have high confidence on the rank orders (observed peak number one is indeed peak number one). On the contrary, if the magnitude difference is small and the rank order can be easily reversed by image nose, we would consider the rank order unreliable and ignore any correspondence established.

In yet another embodiment, it is determined for each peak of the positive sign included in gradient profile 900, whether that peak is the maximum peak within that radius. For example, peak 3 is the maximum peak of the same sign within radius r (i.e., peak 3 is larger than peaks 1, 5, and 7). Although peaks 2, 4, and 6 are within the radius r of peak 3, they are of a different sign (i.e., negative) and thus, have no interaction with peak 3. Peaks 6, 8, and 9 are also maximum peaks of their respective signs within radius r. The peaks that are determined to be non-maximum within their respective radius r are then suppressed. In one embodiment, suppressing the non-maximum peaks means they are discarded and not used further.

Figure 10:
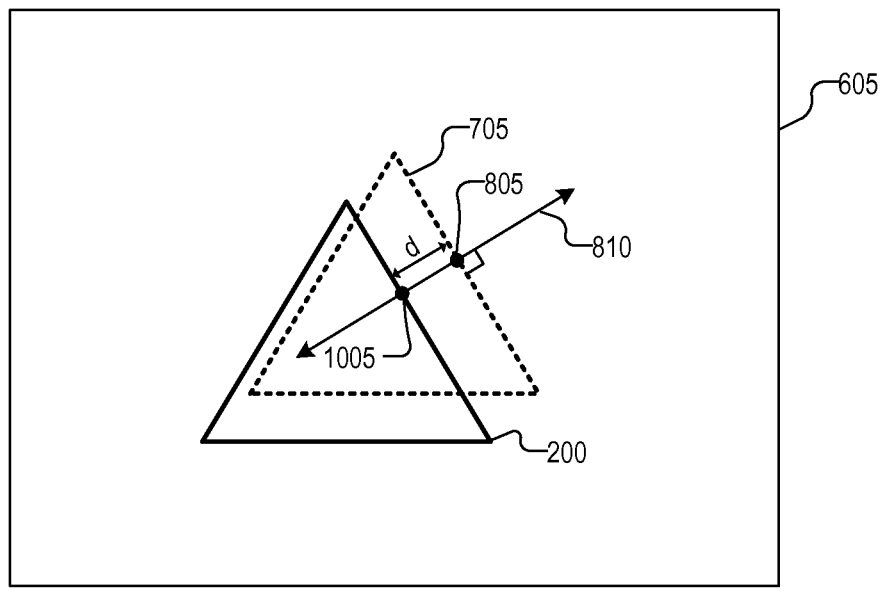
FIG. 10 illustrates a feature candidate point on an edge of the object.
Figure 11:
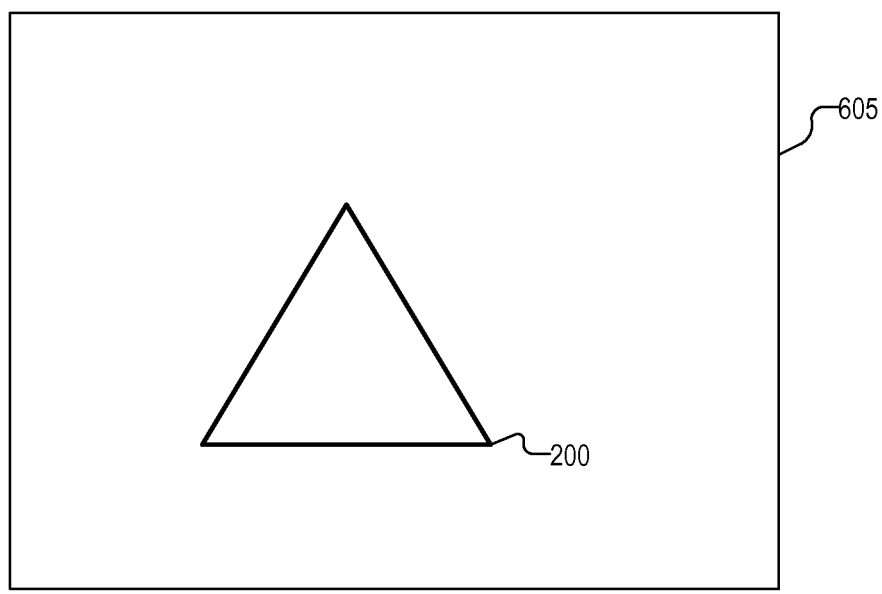
FIG. 11 illustrates the object of the second image and the updated pose of the camera.

Continuing with this example, from the maximum determined peaks the corresponding feature candidate points are then generated. Feature candidate points are pixels along the direction 810 that correspond with the maximum determined peaks. FIG. 10 illustrates feature candidate point 1005 and its corresponding model edge point 805. The mobile platform then adjusts the camera pose to minimize the distance D between the feature candidate point 1005 and the model edge point 805 along direction 810 (i.e., process block 450). Properly estimated camera pose adjusts the model object 705 towards the feature candidate point 1005. FIG. 11 illustrates the object 200 of the second image and the updated pose of the camera. The updated pose of the camera and the tracked object of image 605 may then be used to track further movement of object 200 in a third captured image, and so on.

Although various embodiments have been discussed with respect to one edge point of the model object 705 and one feature candidate point 1005, in practice there may be a two or more edge pixels on one or more edges of the model image 705 for comparison with corresponding feature candidate points. In one embodiment, three or more edge pixels may be needed to track the six degrees of freedom camera pose.

Figure 12:
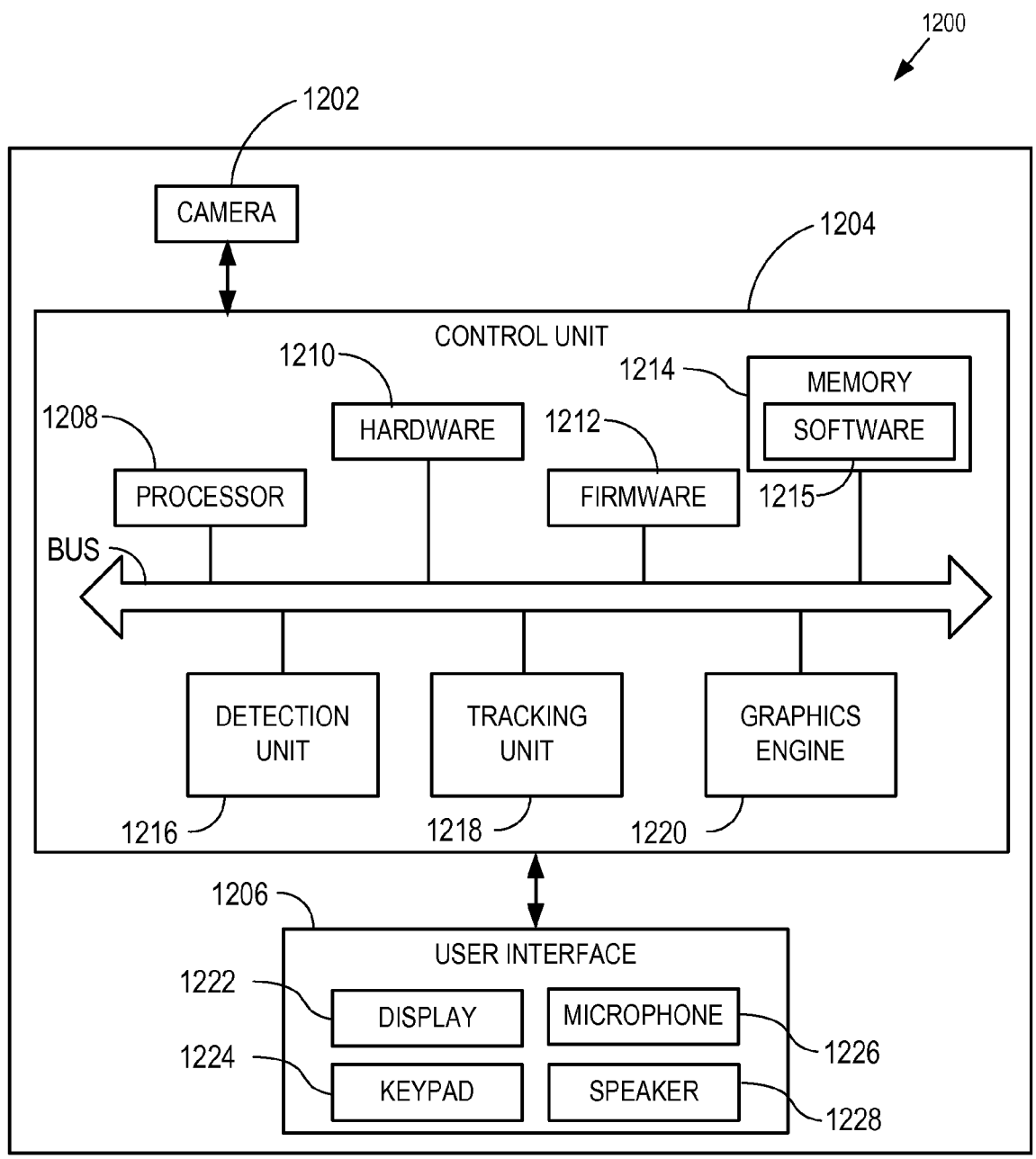
FIG. 12 is a functional block diagram illustrating a mobile platform capable of detecting and tracking an object using rank order filtering.

FIG. 12 is a functional block diagram illustrating a mobile platform 1200 capable of detecting and tracking an object using non-maximum suppression. Mobile platform is one possible implementation of mobile platform 100 of FIGS. 1A, 1B, 2A, and 2B. Mobile platform 1200 includes a camera 1202 as well as a user interface 1206 that includes the display 1222 capable of displaying images captured by the camera 1202. User interface 1206 may also include a keypad 1224 or other input device through which the user can input information into the mobile platform 1200. If desired, the keypad 1224 may be obviated by integrating a virtual keypad into the display 1222 with a touch sensor. User interface 1206 may also include a microphone 1226 and speaker 1228, e.g., if the mobile platform is a cellular telephone.

Mobile platform 1200 may optionally include additional features that may be helpful for AR applications, such as a motion sensor (not shown) including, e.g., accelerometers, magnetometer, gyroscopes, or other similar motion sensing elements, and a satellite positioning system (SPS) receiver capable of receiving positioning signals from an SPS system. Of course, mobile platform 1200 may include other elements unrelated to the present disclosure, such as a wireless transceiver.

Mobile platform 1200 also includes a control unit 1204 that is connected to and communicates with the camera 1202 and user interface 1206, along with other features, such as the motion sensor and SPS receiver, if used. The control unit 1204 accepts and processes data from the camera 1202 and controls the display 1206 in response, as discussed above. Control unit 1204 may be provided by a processor 1208 and associated memory 1214, hardware 1210, software 1215, and firmware 1212.

Control unit 1204 may also include a detection unit 1216 for performing the detection process 310 described above, and a tracking unit 1218 for performing the tracking process 315 (and 400) described above. Control unit 1204 may further include a graphics engine 1220, which may be, e.g., a gaming engine, to render desired data in the display 1206, if desired. Detection unit 1216, tracking unit 1218, and graphics engine 1220 are illustrated separately and separate from processor 1208 for clarity, but may be a single unit and/or implemented in the processor 1208 based on instructions in the software 1215 which is run in the processor 1208. Processor 1208, as well as one or more of the detection unit 1216, tracking unit 1218, and graphics engine 1220 can, but need not necessarily include, one or more microprocessors, embedded processors, controllers, application specific integrated circuits (ASICs), digital signal processors (DSPs), and the like. The term processor describes the functions implemented by the system rather than specific hardware. Moreover, as used herein the term "memory" refers to any type of computer storage medium, including long term, short term, or other memory associated with mobile platform 1200, and is not to be limited to any particular type of memory or number of memories, or type of media upon which memory is stored.

The processes described herein may be implemented by various means depending upon the application. For example, these processes may be implemented in hardware 1210, firmware 1212, software 1215, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any computer-readable medium tangibly embodying instructions may be used in implementing the processes described herein. For example, program code may be stored in memory 1215 and executed by the processor 1208. Memory may be implemented within or external to the processor 1208.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The order in which some or all of the process blocks appear in each process discussed above should not be deemed limiting. Rather, one of ordinary skill in the art having the benefit of the present disclosure will understand that some of the process blocks may be executed in a variety of orders not illustrated.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosures.

Various modifications to the embodiments disclosed herein will be readily apparent to those skilled in the art, and the generic principles defined herein may be applied to other embodiments without departing from the spirit or scope of the invention. Thus, the present disclosures are not intended to be limited to the embodiments shown herein but are to be accorded the widest scope consistent with the principles and novel features disclosed herein.

What is claimed is:

1. A method of real-time tracking of an object, the method comprising:
    capturing, with a camera, a first and a second image of the object, wherein the object has a plurality of edges;
    detecting the object in the first image; and
    tracking the object between the first image and the second image, wherein tracking the object includes:
        obtaining an initial pose of the camera in response to the detecting of the object in the first image;
        projecting an image of a model object onto the second image based on the initial pose of the camera;
        determining a gradient profile of the second image from an edge point on an edge of the model object along a first direction that is normal to the edge of the model object, wherein the gradient profile includes a plurality of peaks;
        computing a radius for determining feature correspondence on the gradient profile;
        determining a rank order of the peaks of the gradient profile along the radius;
        comparing the determined rank order with a predetermined rank order of peaks included in a gradient profile of the model object to generate a feature candidate point of the second image; and
        reducing a distance along the first direction between the feature candidate point and the edge point on the edge of the model object.

2. The method of claim 1, wherein computing the radius for determining feature correspondence on the gradient profile includes computing the radius in response to the initial pose of the camera.

3. The method of claim 1, wherein reducing the distance along the first direction includes updating the pose of the camera.

4. The method of claim 1, further comprising building the model object prior to capturing the first and a second images of the object, wherein building the model object includes generating the rank order of peaks included in a gradient profile of the model object.

5. The method of claim 1, wherein generating the feature candidate point of the second image includes ignoring a correspondence if a magnitude difference between peaks of the gradient profile is smaller than an image noise magnitude.

6. The method of claim 1, wherein comparing the determined rank order with the predetermined rank order includes comparing a plurality of peaks included in the gradient profile of the second image with a plurality of peaks included in the gradient profile of the model object according to each of the peaks rank order within the radius of each respective peak.

7. The method of claim 1, wherein generating the feature candidate point of the second image includes determining whether each of the plurality of peaks is a maximum peak within the radius of each respective peak.

8. The method of claim 7, wherein comparing the determined rank order with the predetermined rank order includes comparing only the maximum peaks included in the gradient profile of the second image with maximum peaks included in the gradient profile of the model object.

9. The method of claim 7, wherein determining whether each of the plurality of peaks is a maximum peak includes suppressing non-maximum peaks that are within the radius of each respective peak.

10. The method of claim 7, wherein the plurality of peaks includes positive peaks representing a dark to light transition of the gradient profile and negative peaks representing a light to dark transition of the gradient profile, and wherein determining whether each of the plurality of peaks is a maximum peak includes selecting maximum peaks only from one of the positive peaks and the negative peaks dependent on a predefined normal direction.

11. A non-transitory computer-readable medium including program code stored thereon for real-time tracking of an object, the program code comprising instructions to:
    capture, with a camera, a first and a second image of the object, wherein the object has a plurality of edges;
    detect the object in the first image; and
    track the object between the first image and the second image, wherein the instructions to track the object further includes instructions to:

obtain an initial pose of the camera in response to the detecting of the object in the first image;

project an image of a model object onto the second image based on the initial pose of the camera;

determine a gradient profile of the second image from an edge point on an edge of the model object along a first direction that is normal to the edge of the model object, wherein the gradient profile includes a plurality of peaks;

compute a radius for determining feature correspondence on the gradient profile;

determine a rank order of the peaks of the gradient profile along the radius;

compare the determined rank order with a predetermined rank order of peaks included in a gradient profile of the model object to generate a feature candidate point of the second image; and reduce a distance along the first direction between the feature candidate point and the edge point on the edge of the model object.

12. The computer-readable medium of claim 11, wherein the instructions to compute the radius to determine feature correspondence on the gradient profile includes instructions to compute the radius in response to the initial pose of the camera.

13. The computer-readable medium of claim 11, wherein the instructions to reduce the distance along the first direction includes instructions to update the pose of the camera.

14. The computer-readable medium of claim 11, further comprising instructions for building the model object prior to the capture of the first and second images of the object, wherein the instructions to build the model object includes instructions to generate the rank order of peaks included in a gradient profile of the model object.

15. The computer-readable medium of claim 11, wherein the instructions to generate the feature candidate point of the second image includes instructions to ignore a correspondence if a magnitude difference between peaks of the gradient profile is smaller than an image noise magnitude.

16. The computer-readable medium of claim 11, wherein the instructions to compare the determined rank order with the predetermined rank order includes instructions to compare a plurality of peaks included in the gradient profile of the second image with a plurality of peaks included in the gradient profile of the model object according to each of the peaks rank order within the radius of each respective peak.

17. The computer-readable medium of claim 11, wherein the instructions to generate the feature candidate point of the second image includes instructions to determine whether each of the plurality of peaks is a maximum peak within the radius of each respective peak.

18. The computer-readable medium of claim 17, wherein the instructions to compare the determined rank order with the predetermined rank order includes instructions to compare only the maximum peaks included in the gradient profile of the second image with maximum peaks included in the gradient profile of the model object.

19. The computer-readable medium of claim 17, wherein the instructions to determine whether each of the plurality of peaks is a maximum peak includes instructions to suppress non-maximum peaks that are within the radius of each respective peak.

20. The computer-readable medium of claim 17, wherein the plurality of peaks includes positive peaks representing a dark to light transition of the gradient profile and negative peaks representing a light to dark transition of the gradient profile, and wherein the instructions to determine whether each of the plurality of peaks is a maximum peak includes instructions to select maximum peaks only from one of the positive peaks and the negative peaks dependent on a predefined normal direction.

21. An apparatus, comprising:

a camera;

memory adapted to store program code for real-time tracking of an object;

a processing unit adapted to access and execute instructions included in the program code, wherein when the instructions are executed by the processing unit, the processing unit directs the apparatus to:

capture, with the camera, a first and a second image of the object, wherein the object has a plurality of edges;

detect the object in the first image; and track the object between the first image and the second image, wherein the processing unit further directs the apparatus to:

obtain an initial pose of the camera in response to the detection of the object in the first image;

project an image of a model object onto the second image based on the initial pose of the camera;

determine a gradient profile of the second image from an edge point on an edge of the model object along a first direction that is normal to the edge of the model object, wherein the gradient profile includes a plurality of peaks;

compute a radius for determining feature correspondence on the gradient profile;

determine a rank order of the peaks of the gradient profile along the radius;

compare the determined rank order with a predetermined rank order of peaks included in a gradient profile of the model object to generate a feature candidate point of the second image; and reduce a distance along the first direction between the feature candidate point and the edge point on the edge of the model object.

22. The apparatus of claim 21, wherein the instructions to compute the radius to determine feature correspondence on the gradient profile includes instructions to compute the radius in response to the initial pose of the camera.

23. The apparatus of claim 21, wherein the instructions to reduce the distance along the first direction includes instructions to update the pose of the camera.

24. The apparatus of claim 21, further comprising instructions for building the model object prior to the capture of the first and second images of the object, wherein the instructions to build the model object includes instructions to generate the rank order of peaks included in a gradient profile of the model object.

25. The apparatus of claim 21, wherein the instructions to generate the feature candidate point of the second image includes instructions to ignore a correspondence if a magnitude difference between peaks of the gradient profile is smaller than an image noise magnitude.

26. The apparatus of claim 21, wherein the instructions to compare the determined rank order with the predetermined rank order includes instructions to compare a plurality of peaks included in the gradient profile of the second image with a plurality of peaks included in the gradient profile of the model object according to each of the peaks rank order within the radius of each respective peak.

27. The apparatus of claim 21, wherein the instructions to generate the feature candidate point of the second image includes instructions to determine whether each of the plurality of peaks is a maximum peak within the radius of each respective peak.

28. The apparatus of claim 27, wherein the instructions to compare the determined rank order with the predetermined rank order includes instructions to compare only the maximum peaks included in the gradient profile of the second image with maximum peaks included in the gradient profile of the model object.

29. The apparatus of claim 27, wherein the instructions to determine whether each of the plurality of peaks is a maximum peak includes suppressing non-maximum peaks that are within the radius of each respective peak.

30. The apparatus of claim 27, wherein the plurality of peaks includes positive peaks representing a dark to light transition of the gradient profile and negative peaks representing a light to dark transition of the gradient profile, and wherein the instructions to determine whether each of the plurality of peaks is a maximum peak includes instructions to select maximum peaks only from one of the positive peaks and the negative peaks dependent on a predefined normal direction.

31. A system for real-time tracking of an objection, the system comprising:
   means for capturing, with a camera, a first and a second image of the object, wherein the object has a plurality of edges;
   means for detecting the object in the first image; and
   means for tracking the object between the first image and the second image, wherein the means for tracking the object includes:
      means for obtaining an initial pose of the camera in response to the detecting of the object in the first image;
      means for projecting an image of a model object onto the second image based on the initial pose of the camera;
      means for determining a gradient profile of the second image from an edge point on an edge of the model object along a first direction that is normal to the edge of the model object, wherein the gradient profile includes a plurality of peaks;
      means for computing a radius for determining feature correspondence on the gradient profile;
      means for determining a rank order of the peaks of the gradient profile along the radius;
      means for comparing the determined rank order with a predetermined rank order of peaks included in a gradient profile of the model object to generate a feature candidate point of the second image; and
      means for reducing a distance along the first direction between the feature candidate point and the edge point on the edge of the model object.

32. The system of claim 31, wherein the means for computing the radius includes means for computing the radius in response to the initial pose of the camera.

33. The system of claim 31, wherein the means for reducing the distance along the first direction includes means for updating the pose of the camera.

34. The system of claim 31, further comprising means for building the model object prior to capturing the first and a second images of the object, wherein building the model object includes generating the rank order of peaks included in a gradient profile of the model object.

35. The system of claim 31, wherein the means for generating the feature candidate point of the second image includes means for ignoring a correspondence if a magnitude difference between peaks of the gradient profile is smaller than an image noise magnitude.

36. The system of claim 31, wherein the means for comparing the determined rank order with the predetermined rank order includes means for comparing a plurality of peaks included in the gradient profile of the second image with a plurality of peaks included in the gradient profile of the model object according to each of the peaks rank order within the radius of each respective peak.

37. The system of claim 31, wherein the means for generating the feature candidate point of the second image includes means for determining whether each of the plurality of peaks is a maximum peak within the radius of each respective peak.

38. The system of claim 37, wherein the means for comparing the determined rank order with the predetermined rank order includes comparing only the maximum peaks included in the gradient profile of the second image with maximum peaks included in the gradient profile of the model object.

39. The system of claim 37, wherein the means for determining whether each of the plurality of peaks is a maximum peak includes means for suppressing non-maximum peaks that are within the radius of each respective peak.

40. The system of claim 37, wherein the plurality of peaks includes positive peaks representing a dark to light transition of the gradient profile and negative peaks representing a light to dark transition of the gradient profile, and wherein the means for determining whether each of the plurality of peaks is a maximum peak includes means for selecting maximum peaks only from one of the positive peaks and the negative peaks dependent on a predefined normal direction.

* * * * *